United States Patent [19]

Ashcraft et al.

[11] 4,212,756
[45] Jul. 15, 1980

[54] DIELECTRIC COMPOSITION STABILIZED AGAINST WATER TREEING WITH ORGANO SILANE COMPOUNDS

[75] Inventors: Arnold C. Ashcraft, Hightstown; Robert J. Turbett, Millington, both of N.J.; Timothy R. Burke, Houston, Tex.

[73] Assignee: Union Carbide Corporation, New York, N.Y.

[21] Appl. No.: 40,060

[22] Filed: May 17, 1979

Related U.S. Application Data

[63] Continuation-in-part of Ser. No. 864,751, Dec. 27, 1977, abandoned.

[51] Int. Cl.$^2$ ............................................. H01B 3/44
[52] U.S. Cl. ................................... 252/63.2; 252/63.7; 427/117
[58] Field of Search ........................... 252/63.7, 63.2; 174/110 PM, 110 S, 110 SR, 110 R; 427/117; 260/45.85 E; 525/5

[56] References Cited

U.S. PATENT DOCUMENTS

| | | | |
|---|---|---|---|
| 3,646,155 | 2/1972 | Scott | 260/827 |
| 3,649,542 | 3/1972 | Hasebe et al. | 252/63.7 X |
| 3,832,326 | 8/1974 | North et al. | 260/42.29 |
| 3,943,271 | 3/1976 | Bahder et al. | 174/110 PM X |
| 3,960,739 | 6/1976 | Mackenzie | 252/63.2 |
| 4,008,113 | 2/1977 | Glander et al. | 174/110 S X |
| 4,042,776 | 8/1977 | Matsuba et al. | 174/110 PM X |

FOREIGN PATENT DOCUMENTS 45-27628 9/1970 Japan.
1234034 6/1971 United Kingdom.

Primary Examiner—Harris A. Pitlick
Attorney, Agent, or Firm—Donald M. Papuga; Warrick E. Lee, Jr.

[57] ABSTRACT

A dielectric composition devoid of filler and resistant to water treeing comprising ethylene polymer, antioxidant for said polymer, and effective amounts, as a water treeing inhibitor, of at least one organo silane of the following formula:

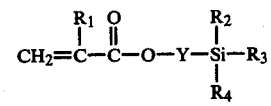

wherein $R_1$ is hydrogen or $C_1$ to $C_4$ alkyl; Y is $C_1$ to $C_8$ alkylene or $C_6$ to $C_{18}$ substituted or unsubstituted arylene; $R_2$ is $C_1$ to $C_8$ alkyl, $C_1$ to $C_8$ alkoxy, $C_6$ to $C_{18}$ substituted or unsubstituted aryl, $C_1$ to $C_8$ acyloxy, $C_6$ to $C_{18}$ substituted or unsubstituted aryloxy; $R_3$ and $R_4$ are independently selected from $C_1$ to $C_8$ alkoxy, $C_1$ to $C_8$ acyloxy or $C_6$ to $C_{18}$ substituted or unsubstituted aryloxy.

11 Claims, 4 Drawing Figures

METHOD OF MEASUREMENT OF WATER TREE LENGTH

FIG. 1
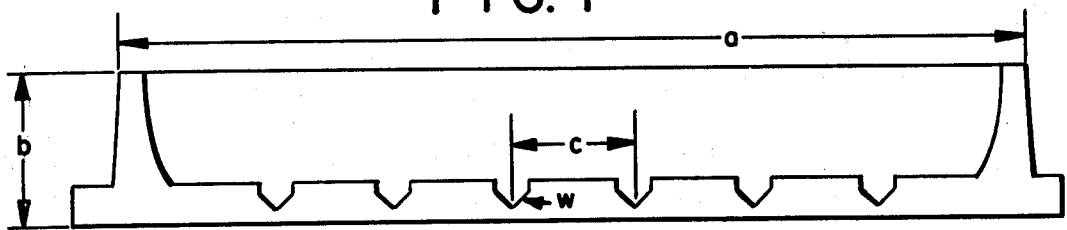
FIG. 1A
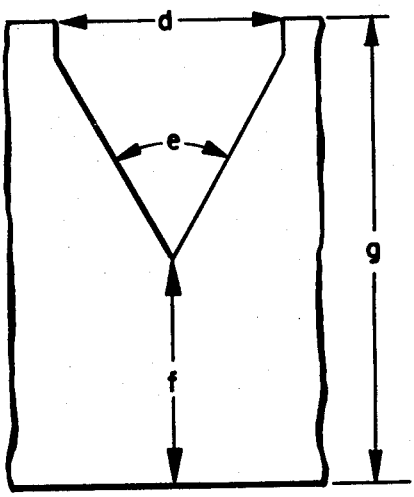
FIG. 2
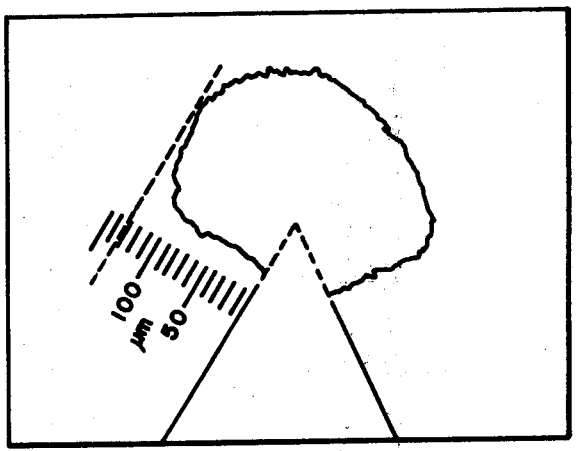
METHOD OF MEASUREMENT OF WATER TREE LENGTH
FIELD DEPENDENCE OF WATER TREE GROWTH RATE
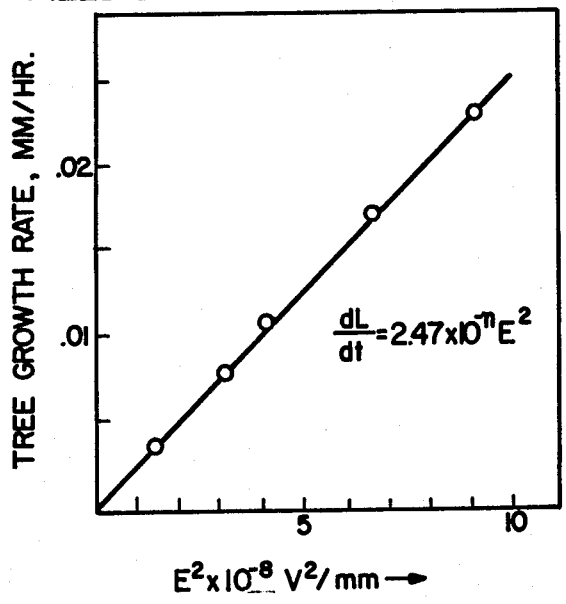
$$\frac{dL}{dt} = 2.47 \times 10^{-11} E^2$$
FIG. 3

DIELECTRIC COMPOSITION STABILIZED AGAINST WATER TREEING WITH ORGANO SILANE COMPOUNDS

This is a Continuation-in-Part of Application Ser. No. 864,751, filed Dec. 27, 1977 now abandoned.

BACKGROUND OF THE INVENTION

1. Field of the Invention

This invention relates to a dielectric composition, resistant to water treeing, based on ethylene polymers.

2. Description of the Prior Art

Compositions based on polyolefins are well-known and they are used extensively as insulation materials for wire and cable. As insulation materials, properties of the composition such as intrinsic electrical strength, corona resistance and resistance to treeing are important.

Intrinsic electrical breakdown is the catastrophic failure of a dielectric accompanied by arcing or discharge through an ionized channel in the dielectric. The intrinsic dielectric strength is considered to be an inherent property of the dielectric material.

In power cable applications for transmitting relatively high voltage loads such as, 5 KV and above, corona may be a problem because it may lead to the premature breakdown of the cable insulation. Corona is an electrical plasma resulting from the ionization of a gaseous dielectric in regions of high electrical field. Corona resistance is the ability of a dielectric to withstand the corrosive action of an electrical plasma in contact with it.

When used as a high voltage power cable insulation, olefin base compositions undergo a prebreakdown phenomenon known as treeing. This type of damage progresses through a dielectric section under electrical stress so that, if visible, its path looks something like a tree. Treeing can occur and progress slowly by periodic partial discharge, it may occur slowly in the presence of moisture without any partial discharge, or it may occur rapidly as the result of an impulse voltage. Trees may form at sites of high electrical stress such as contaminants or voids in the body of the insulation or at irregularities at the insulation-semiconductive screen interface.

In solid organic dielectrics, treeing is the most likely mechanism of electrical failures which do not occur catastrophically, but rather appear to be the result of a more lengthy process. It is desired to extend the service life of olefin-insulated cables by modification of the insulating materials so that trees are initiated at higher voltages than usual or so that the rate of growth of trees is reduced once initiated.

Electrical treeing results from internal electrical discharges which decompose the dielectric. Although high voltage impulses can produce electrical trees, and the presence of internal voids and contaminants is undesirable, the damage which results from application of moderate a.c. voltages to electrode/insulation interfaces which contain imperfections is more commercially significant. In this case, very high, localized stress gradients can exist and with sufficient time lead to initiation and growth of trees which may be followed by breakdown. An example of this is a high voltage power cable or connector with a rough interface between the conductor or conductor shield and the primary insulator. The failure mechanism involves actual breakdown of the modular structure of the dielectric material perhaps by electron bombardment. Much of the prior art is concerned with the inhibition of electrical trees.

Water treeing is a deterioration of a solid dielectric material which is simultaneously exposed to moisture and an electric field. It is a significant factor in determining the useful life of buried high voltage power cables. Water trees initiate from sites of high electrical stress such as rough interfaces, protruding conductive points, voids, or imbedded contaminants but at a lower field than that required for electrical trees. In contrast to electrical trees, water trees are characterized by: (a) the presence of water is essential for their growth; (b) no partial discharge is normally detected during their growth; (c) they can grow for years before reaching a size where they may contribute to a breakdown; (d) although slow growing, they are initiated and grow in much lower electrical fields than those required for the development of electrical trees.

Thus, intrinsic electric breakdown, failure by corona, electrical treeing and water treeing are different and the mechanisms for each are different. It follows that a different solution is required to effect an improvement in a dielectric material for each mode of failure involved.

Additionally, it is known that when cross-linked olefin polymers, particularly polyethylene, are used for power cable insulation, a crosslinking agent may function as a water treeing inhibitor. When dicumyl peroxide is used as the crosslinking agent in polyethylene, for example, the peroxide residue functions as a tree inhibitor for some time after curing. However, these residues are eventually lost at the temperatures of cable service. Therefore, in order to be an effective water treeing inhibitor an additive must be such that it is retained in the olefin composition at the temperature of cable service.

SUMMARY OF THE INVENTION

It has now been found that dielectric compositions based on ethylene polymers and used as insulation materials in high voltage wire and cable are protected from water treeing under long term use under high voltage conditions, if the composition contains as a water treeing inhibitor, one or more organo silanes.

An object of the present invention is to provide a process for employing dielectric materials as insulation in high voltage wire and cable while protecting such dielectric material against water treeing.

Another object of the present invention is to provide dielectric compositions which are resistant to water treeing on high voltage wire and cable and which retain this resistance under the conditions of use of the wire and cable.

A further object of the present invention is to provide a high voltage wire and cable which is resistant to water treeing.

These and other objects are achieved by employing certain organo silane compounds as water treeing inhibitors in combination with ethylene polymers in the dielectric insulation compositions of the present invention.

DESCRIPTION OF THE PREFERRED EMBODIMENTS

The Dielectric Composition

The dielectric composition used in the present invention comprises, in weight ratio, 100 parts by weight of ethylene polymer, as described below, and about 0.1 to 10, and preferably, about 0.5 to 3.0, parts by weight of at least one of the organo silane compounds which are also described below.

Ethylene Polymer

The ethylene polymers which are used in the compositions of the present invention are solid (at 25° C.) materials which may be homopolymers, or copolymers of ethylene. The ethylene copolymers contain at least 30 weight percent of ethylene and up to about 70 weight percent of propylene, and/or up to about 50 weight percent of one or more other organic compounds which are interpolymerizable with ethylene. These other compounds which are interpolymerizable with ethylene are preferably those which contain polymerizable unsaturation, such as is present in compounds containing an ethylene linkage, $>C=C<$. These other interpolymerizable compounds may be hydrocarbon compounds such as, butene-1, pentene-1, isoprene, butadiene, bicycloheptene, bicycloheptadiene, and styrene, as well as vinyl compounds, such as, vinyl acetate and ethyl acrylate.

These copolymers could thus include those containing $>0$ to 70 weight percent of propylene and 30 to $<100$ weight percent of ethylene; and $>0$ to $<50$ weight percent butene-1 or vinyl acetate and 50 to $<100$ weight percent of ethylene; and $>0$ to $<30$ weight percent of propylene, $>0$ to 20 weight percent of butene-1 and 50 to $<100$ weight of ethylene.

Preferred copolymers are ethylene/ethyl acrylate, ethylene/propylene, ethylene/butene and the like.

Also included in the term polymer are blends of one polymer with one or more other polymers. Illustrative of such blends are polyethylene with polypropylene, low-density polyethylene with high-density polyethylene, and polyethylene with olefin copolymers such as these indicated above.

The low density ethylene copolymers with $\alpha$-olefins may be made under low pressure conditions of about 150 to 300 psi with supported chromium oxide based catalysts that are modified with titanium and optionally, fluorine, as disclosed in U.S. Pat. Nos. 3,606,736 and 4,011,382. The disclosures of these patents are included herein by reference.

The ethylene polymers described herein have a density (ASTM 1505 test procedure with conditioning as in ASTM D-1248-72) of about 0.86 to 0.96 grams/cubic centimeter and a Melt Index (ASTM D-1238 at 44 psi test pressure) of about 0.1 to 10 decigrams per minute.

Organo Silane

The organo silane which is employed in the dielectric compositions of the present invention is selected from one or more compounds of the following formula:

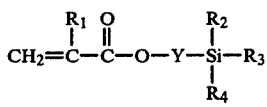

wherein $R_1$ is hydrogen or $C_1$ to $C_4$ alkyl; Y is $C_1$ to $C_8$ alkylene or $C_6$ to $C_{18}$ substituted or unsubstituted arylene; $R_2$ is $C_1$ to $C_8$ alkyl, $C_1$ to $C_8$ alkoxy, $C_6$ to $C_{18}$ substituted or unsubstituted aryl, $C_1$ to $C_8$ acyloxy, $C_6$ to $C_{18}$ substituted or unsubstituted aryloxy; $R_3$ and $R_4$ are independently selected from $C_1$ to $C_8$ alkoxy, $C_1$ to $C_8$ acyloxy or $C_6$ to $C_{18}$ substituted or unsubstituted aryloxy.

The preferred organo silane is

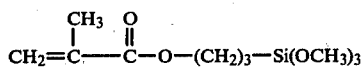

These compounds are generally well known in the art and are commercially available.

Adjuvants

In addition to the ethylene polymer and the organo silane, the dielectric compositions of the present invention may also include cross-linking agents where the dielectric composition is to be used as a vulcanized composition rather than as a thermoplastic composition, and it is to be chemically cross-linked. These chemical vulcanizing, curing or cross-linking agents are well known to those in the art and include the organic peroxide type of cross-linking agents which are disclosed for example, in U.S. Pat. Nos. 2,826,570, 2,888,424, 2,916,481, 3,079,370 and 3,296,189, the disclosures in such patents being incorporated herein by reference. The chemical cross-linking agents may be used individually or in combination with one another, and they are used in cross-linking effective amounts. The preferred cross-linking agent is di-α-cumyl peroxide.

The dielectric compositions of the present invention also advantageously include one or more suitable high temperature antioxidants for the ethylene polymer in such compositions. The antioxidants include sterically hindered phenols or amines. Polymerized 2,2,4-trimethyl dihydroquinoline may also be used. These are used in conventional amounts to obtain the intended effect in the composition.

Other adjuvants which may be employed in the compositions of the present invention would include adjuvants commonly employed in ethylene polymer based dielectric compositions including lubricants, oil extenders, dyes and colorants and metal deactivators. However, inorganic fillers, such as carbon black, clay, talc, silica, or magnesium oxide, are not used with compositions of the present invention.

Proper adjuvants would be used in amounts designed to provide the intended effect in the resulting composition.

The dielectric compositions of the present invention may also be extended with polymers other than the ethylene polymer which are compatible, i.e., can be physically blended or alloyed, or grafted with the ethylene polymer. The resulting compositions should contain at least about 30 weight percent of interpolymerized ethylene in all the polymers that may be present in the composition, based on the total weight of the resulting composition. The other polymers which may be used would include polyvinyl chloride and polypropylene, ethylene propylene rubbers (EPA), ethylene, propylene, diene polymers (EPDM), styrene-butadiene-styrene block copolymers, urethane elastomers, polyester elastomers, natural rubber.

The total amount of adjuvants used will range from 0 to about 60 weight percent, perferably 0 to 10 weight percent based on the total weight of the dielectric composition.

Processing of the Dielectric Compositions

All of the components of the dielectric compositions of the present invention are usually blended or compounded together prior to their introduction into the extrusion device from which they are to be extruded onto an electrical conductor. The ethylene polymer and the other desired constituents may be blended together by any of the techniques used in the art to blend and compound thermoplastics to homogeneous masses. For instance, the components may be fluxed on a variety of apparatus including multi-roll mills, screw mills, continuous mixers, compounding extruders and Banbury mixers.

After the various components of the compositions of the present invention are uniformly admixed and blended together, they are further processed, in accordance with the process of the present invention, in conventional extrusion apparatus at about 120° to 160° C. for cross-linkable compositions and about 200° C. for thermoplastic compositions.

After being extruded onto a wire or cable, or other substrate, the cross-linkable compositions of the present invention are vulcanized at elevated temperatures of about 180° C. and preferably at 215°–230° C. using conventional vulcanizing procedures.

Evaluation of Organo Silane Water Treeing Inhibitors in Dielectric Compositions In order to determine the utility and effectiveness of the water treeing stabilized dielectric compositions of the present invention, the compositions were evaluated with the organo silanes incorporated therein by use of an accelerated water tree test which incorporates a combination of frequency acceleration and a standard-defect specimen. The test utilizes a compression molded dish-shaped specimen having 24 conical depressions molded into the bottom. FIG. 1 shows a cross sectional view of the specimen where a is 152.4 millimeters, b is 25.4 millimeters and c is 19.05 millimeters. The conical depression, W, of FIG. 1 is magnified in FIG. 1A, where d is 3.18 millimeters, e is 60 degrees, f is 3.18 millimeters, g is 6.35 millimeters and the tip radius is about 5 $\mu$m. The calculated maximum field is about 250 kV/mm in a typical 15 kV power cable.

When testing these specimens, 100 ml. of an electrolyte solution is poured into the dish which is then placed into a grounded bath, usually containing the same electrolyte solution. A 50 millimeter diameter platinum wire ring is then immersed in the electrolyte in the dish and connected to the voltage source.

Preliminary experiments at 8.5 kHz showed that electrical treeing followed by breakdown rapid occurred at test voltages of 10 kV or above. In order to limit the study to the effects of water treeing, the voltage used in the examples was 5 kV. Under these conditions a low density polyethylene specimen will develop water trees at the tips of the conical depressions between 120 and 240 micrometers in length in 24 hours using 0.01 N NaCl in distilled water as the electrolyte solution.

To facilitate study of the water trees found, each of the twelve conical depressions nearest the center of the specimen is punched out using a 12.7 millimeter ($\frac{1}{2}$ inch) circular die and an arbor press. The resulting discs are placed in a boiling solution of 0.50 g methylene blue and 8 milliliter concentrated aqueous ammonia (28% approx.) in 250 milliliters distilled water for 30 minutes. The discs are then sectioned and mounted on microscope slides for examination. Specimens prepared in this way have been kept for periods up to two years without apparent deterioration of the appearance of water trees.

A typical water tree grown for 24 hours in low density polyethylene under the above conditions and stained as described, is depicted in FIG. 2. The growth occurs in an approximately hemispherical region centered on the tip of the cone, which is usually heavily obscured. Because of this, the most satisfactory direction for measuring the extent of tree growth was found to be perpendicular to the side of the cone as indicated in FIG. 2. In our procedure all twelve of the stained trees from the central group of conical depressions are measured and the average length calculated.

The rate of growth of water trees, dL/dt, varies from their initiation, when the growth rate is quite fast, to a much slower rate after they have grown large. The data are fit by the empirical equation shown below:

$$\frac{dL}{dt} = 0.0240 t^{-.606} \tag{1}$$

or equivalently:

$$\frac{dL}{dt} = 0.000323 L^{-1.54}$$

where L is the length of the growing tree and t is the time at which the measurement is taken, in hours.

If one assumes that water trees are relatively conductive compared to polyethylene, one can calculate the electrical field, E, at the boundry of a growing tree from equation 3 which was derived for the point-to-plane geometry of the present test method.

$$E = \frac{V \sqrt{1 + r/d}}{r \tanh^{-1}(\sqrt{1/(1 + r/d)})}, \tag{3}$$

where V is the voltage applied to the electrolyte in the specimen dish, r, the point electrode radius, is identified with L, the length of the growing tree, and d is 3.175 mm$-$L, the distance to the ground electrode. A graph of experimentally measured tree growth rates, dL/dt, plotted as a function of $E^2$, calculated by equation 3, is given in FIG. 3. The straight line passing through the data points is the graph of the equation:

$$\frac{dL}{dt} = kE^2 \tag{4}$$

where k is the rate constant for water treeing, and has the value of $2.47 \times 10^{-11}$ (mm/hr)/(V$^2$/mm$^2$) for this experiment. Since E is known as a function of L from equation 3, one can numerically integrate the following equation 5:

$$\frac{dL}{E^2} = k dt \tag{5}$$

to provide a value for the rate constant for treeing from an individual measurement of tree length.

$$\int_0^L \frac{dL}{E^2} = \frac{1}{V^2} \int_0^L \frac{r^2 (\tanh^{-1}\sqrt{1/(1 + r/d)})^2 dL}{1 + r/d} = \tag{6}$$

-continued $$\frac{I}{V^2} = k \int_0^t dt = k\Delta t$$

$$k = \frac{I}{V^2 \Delta t} \quad (7)$$

wherein dL, E, V, r, d and t are as previously defined. "Water Tree Growth Rate" is a relative rate determined from the expression k(material under test)/k(thermoplastic low density polyethylene homopolymer control), where k is defined by equation (7).

The following examples are merely illustrative of the scope of the present invention and are not intended as a limitation upon the scope thereof.

General Admixing Procedure

The dielectric compositions used in the Examples below were all prepared according to either Procedure A or Procedure B as follows:

Procedure A

Polyethylene homopolymer of 0.2 dg/min. Melt Index and 0.92 g/cc density, organo silane and antioxidant were charged to a Banbury mixer and compounded to a melt temperature of approximately 140° C. The resulting composition was then sheeted on a 2-roll mill, granulated and compression molded into test specimens, as heretofore described, at approximately 165° C.

Procedure B

Polyethylene homopolymer of 2.0 dg/min. melt index and 0.92 g/cc density, organo silane, antioxidant and dicumyl peroxide were charged to a Brabender mixer and compounded to a melt temperature no higher then 130° C. The resulting composition was granulated and compression molded at 125° C., as heretofore described and then cured in the mold at approximately 180° C. Before testing, the molded specimen is annealed in an oven at 115° C. for 15 minutes and then heated in a vacuum oven at 75° C. for 48 hours to remove byproducts of the peroxide decomposition.

CONTROL

The water tree growth rate of a commercial grade of polyethylene homopolymer having a Melt Index of 0.2 dg/minute and a density of 0.92 grams/cubic centimeter and containing 0.10 percent of 4,4'-thiobis(3-methyl-6-tertbutyl phenol) and mixed according to Procedure A, but without organo silane additive, was measured. The water tree growth rate was obtained by measuring the length of water trees formed in 24 hours and calculating the absolute rate of tree growth as heretofore described by equations (1) to (7). A relative value of 1.0 for water tree growth rate was assigned to this composition.

Example I

The water tree growth of a cured cross-linkable polyethylene, mixed according to Procedure B, was measured. Crosslinking was accomplished by using 2 percent of dicumyl peroxide. Also, 0.20 percent of 4,4'-thiobis(3-methyl-6-tert butyl phenol) was present as antioxidant. The WTGR was obtained as heretofore described. Relative water tree growth rate (hereinafter WTGR) is the ratio of the absolute rate for the test specimen to the absolute rate of the control. The WTGR for this composition was 0.06.

Example 2

Example 1 was exactly repeated except that the composition was placed in a vacuum oven at 75° C. for 48 hours. The WTGR for this composition was 0.82.

Example 3

A crosslinkable composition containing the polyethylene of Example 1, 1.5 percent of γ-methacryloxypropyltriethoxy silane, 1.9 percent dicumyl peroxide and 0.15 percent each of thiodiethylene-bis(3,5-ditert butyl-4-hydroxy)hydrocinnamate and distearylthiodiproprionate as antioxidant was prepared according to Procedure B in a laboratory Brabender mixer at about 130° C. The product was granulated and compression molded at 115° C. to form a water tree test specimen as heretofore described. The product was cured in the mold by heating to 175° C. for 15 minutes. After removal from the mold, the test specimen was annealed in an oven for 15 minutes at 115° C. and then vacuum treated for 48 hours at 75° C. to remove peroxide decomposition products. The water tree growth rate was obtained by measuring the length of water trees formed in 24 hours and calculating the absolute rate of tree growth as heretofore described in equations (1) to (7). The WTGR for this composition was 0.03.

Example 4

Example 3 was exactly repeated except that 1.0 weight percent of γ-methacryloxy propyltrimethoxy silane was used and the composition was prepared in a commercial compounding line consisting of a continuous mixer, extruder and pelletizing device. The WTGR was measured and the results are shown in the Table.

TABLE

| Example | Organo Silane (wt.%) | WTGR |
|---------|----------------------|------|
| 1 | — | 0.06 |
| 2 | — | 0.82 |
| 3 | γ-methacryloxypropyl-triethoxy silane (1.5) | 0.03 |
| 4 | γ-methacryloxypropyl-triethoxy silane (1.0) | 0.12 |

The data in the Table shows that the organo silane inhibitor of this invention reduced the rate of water tree growth and that vacuum treatment did not cause any loss of inhibition as it did in the Control of Example 2.

Example 5

A thermoplastic composition of the following ingredients: ethylene-butene-1 copolymer having a Melt Index of 0.8 dg./minute and a density of 0.92 grams/cubic centimeter, 1.0 percent of a silane prepared by reacting γ-methacryloxy propyltrimethoxy silane with p-hydroxy acetophenone in equimolar ratios (to cause interchange with one methoxy group of the silane) and 0.10 percent of thiodiethylene-bis(3,5-ditert butyl-4-hydroxy)hydrocinnamate antioxidant was prepared according to Procedure A. The WTGR of this composition was 0.17.

What is claimed is:

1. A dielectric composition devoid of filler and resistant to water treeing comprising ethylene polymer, antioxidant for said polymer, and effective amounts, as a water treeing inhibitor, of at least one organo silane of the following formula:

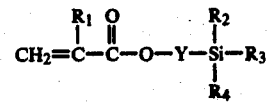

wherein $R_1$ is hydrogen or $C_1$ to $C_4$ alkyl; Y is $C_1$ to $C_8$ alkylene or $C_6$ to $C_{18}$ substituted or unsubstituted arylene; $R_2$ is $C_1$ to $C_8$ alkyl, $C_1$ to $C_8$ alkoxy, $C_6$ to $C_{18}$ substituted or unsubstituted aryl, $C_1$ to $C_8$ acyloxy, $C_6$ to $C_{18}$ substituted or unsubstituted aryloxy; $R_3$ and $R_4$ are independently selected from $C_1$ to $C_8$ alkoxy, $C_1$ to $C_8$ acyloxy or $C_6$ to $C_{18}$ substituted or unsubstituted aryloxy.

2. The composition of claim 1, wherein said water treeing inhibitor is:

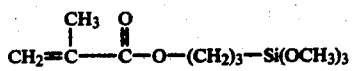

3. The composition of claim 1, wherein said ethylene polymer is a copolymer.

4. The composition of claim 3, wherein said copolymer comprises an ethylene-α-olefin copolymer.

5. The composition of claim 4, wherein said ethylene-α-olefin copolymer is ethylene-α-butene copolymer.

6. The composition of claim 1, further comprising effective amounts of at least one cross-linking agent for said ethylene polymer.

7. The composition of claim 6, wherein said cross-linking agent comprises at least one organic peroxide.

8. The composition of claim 7, wherein said organic peroxide comprises dicumyl peroxide.

9. An electric wire or cable comprising a metallic conductor and insulation, said insulation comprising the composition of claims 1, 2, 3, 4, or 5.

10. An electric wire or cable comprising a metallic conductor and insulation, said insulation comprising the composition of claims 6, 7, or 8, which is cross-linked.

11. In a process for employing an olefin polymer insulated wire or cable construction in a water containing environment, the improvement which comprises employing as said construction one in which the insulation is a composition devoid of filler comprising ethylene polymer, antioxidant for said polymer, and effective amounts, as a water treeing inhibitor, of at least one organo silane of the following formula:

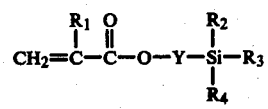

wherein $R_1$ is hydrogen or $C_1$ to $C_4$ alkyl; Y is $C_1$ to $C_8$ alkylene or $C_6$ to $C_{18}$ substituted or unsubstituted arylene; $R_2$ is $C_1$ to $C_8$ alkyl, $C_1$ to $C_8$ alkoxy, $C_6$ to $C_{18}$ substituted or unsubstituted aryl, $C_1$ to $C_8$ acyloxy, $C_6$ to $C_{18}$ substituted or unsubstituted aryloxy; $R_3$ and $R_4$ are independently selected from $C_1$ to $C_8$ alkoxy, $C_1$ to $C_8$ acyloxy or $C_6$ to $C_{18}$ substituted or unsubstituted aryloxy.

* * * * *